United States Patent [19]
Kimura et al.

[11] Patent Number: 6,108,717
[45] Date of Patent: *Aug. 22, 2000

[54] CONTROL SYSTEM USING PLURAL OBJECTS, A PROGRAMMING METHOD THEREFOR, AND A PERIPHERAL DEVICES CONTROL SYSTEM

[75] Inventors: Yoshihiro Kimura; Yutaka Hisamatsu, both of Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,716

[22] Filed: Sep. 4, 1996

[30] Foreign Application Priority Data

Sep. 6, 1995 [JP] Japan .................................. 7-229545
Oct. 12, 1995 [JP] Japan .................................. 7-264193

[51] Int. Cl.⁷ .................................................. G06F 13/10
[52] U.S. Cl. .............................. 710/8; 709/303; 705/16
[58] Field of Search ............................ 395/84, 825, 566, 395/200.33, 680, 681, 682, 683, 684, 685; 707/103; 710/8; 705/16, 21

[56] References Cited

U.S. PATENT DOCUMENTS

| | | | |
|---|---|---|---|
| 5,485,617 | 1/1996 | Stutz et al. | 395/700 |
| 5,517,655 | 5/1996 | Collins et al. | 395/800 |
| 5,594,920 | 1/1997 | Ebina et al. | 395/224 |
| 5,628,017 | 5/1997 | Kimmerly et al. | 395/704 |
| 5,724,588 | 3/1998 | Hill et al. | 395/684 |

FOREIGN PATENT DOCUMENTS

| | | |
|---|---|---|
| 674 259 A2 | 3/1994 | European Pat. Off. . |
| 0 660 231 | 6/1995 | European Pat. Off. . |
| 63-052253 | 3/1988 | Japan . |

OTHER PUBLICATIONS

Shepherd et al., "How MFC Doe ActiveX Connections", Dr. Dobb's Journal, vol. 22, No. 4, p. 109–13, Apr. 1997.

Dr. Dobbs Special Report, vol. 19, No. 166, CA, USA, pp. 42–49, XP002021208, Kraig Brockschmidt: "OLE Integration Technologies" Winter 1994/1995 p. 46, middle column, line 14—p. 47, middle column, line 9; figure 6, p. 49, left–hand column, last paragraph—right–hand column, line 31.

Primary Examiner—Robert W. Beausoliel, Jr.
Assistant Examiner—Scott T. Baderman
Attorney, Agent, or Firm—John C. Chen

[57] ABSTRACT

A control system built around plural common objects is provided with greater flexibility and easy customizability, and a programming method for the control system is provided. An interface object (15) capable of two-way communications is created and used when first OCX (10), a common object, creates and controls second OCX (11). This interface object (15) is able to return events generated by second OCX (11) to first OCX (10), and first OCX (10) is able to completely control the operation of second OCX (11).

6 Claims, 8 Drawing Sheets

CONTROL SYSTEM USING PLURAL OBJECTS, A PROGRAMMING METHOD THEREFOR, AND A PERIPHERAL DEVICES CONTROL SYSTEM

BACKGROUND OF THE INVENTION

1. Field of the Invention

The present invention relates to a control system comprising plural common objects that can be shared by plural application programs. The present invention relates specifically to a control system that can be customized using the common objects, to a programming method for the control system, and to a peripheral devices control system applying the control system and programming method.

2. Description of the Related Art

Computers are used today to execute a wide range of processes, and use a variety of peripheral equipment that can be connected to computers. It is therefore necessary to build and provide flexible computerized systems that can be customized to a user's working environment and objectives (needs). For example, it is possible today to connect different types of printers, displays, bar code readers, and other input/output devices using a common standard bus. When the software needed to control these I/O devices is installed in the computer, the control system must be able to appropriately control each of these many devices. It is also easy to build a networked computing environment in which plural computers are connected to a common network. This makes it desirable to be able to control the processes and procedures executed by each computer on the network.

One method of constructing this type of flexible system executed in a computer is to create plural common objects that can be shared, and write the operating system and application programs using these common objects. An example of such a system is the Object Linking and Embedding (OLE) technology developed by Microsoft, and the related OLE Automation or OLE custom controls (OCX), interfaces for OLE programming.

One problem with such conventional programming methods, however, is that when one common object uses another common object, the functions of both common objects cannot be sufficiently realized. Using the custom controls OCX described above, for example, a client OCX can access properties and methods from a server OCX, but the client OCX cannot receive events generated by the server OCX.

This means that if the first OCX is an object for controlling the functions of a peripheral device such as a printer, and the second OCX is a driver for the type of peripheral device controlled by the first OCX, the first OCX can control the functions of the peripheral device via the second OCX, but cannot receive peripheral device status information through the second OCX.

OBJECTS OF THE INVENTION

The object of the present invention is therefore to resolve this problem by providing a method and system for easily constructing a variety of operating systems and application programs using plural common objects that can be shared by plural application programs. More specifically, the object of the present invention is to provide a method and system that improve the interface between common objects, and enable each common object to fully utilize the functions of other common objects.

In other words, the object of the present invention is to provide a system whereby when one common object is the client or controller and another common object is the server, events generated by the server object can be recognized by the client or controller object, and to provide a method for constructing such systems.

SUMMARY OF THE INVENTION

The present invention specifically applies to a system comprising plural control objects used as common objects each comprising a first function for serving properties including attribute values or methods for calling implemented functions to an application program, another control object; and a second function for posting events including asynchronously occurring actions.

When a control system executable by a computer is constructed by means of this system, at least one second control object is created by a first control object with the first control object controlling the second object. In this type of control system, the present invention provides an interface object having a function for communicating properties or methods between the first control object and the second object, and a function for communicating events from the second object to the first control object.

It is therefore possible by means of the present invention for a first control object and a second common object to communicate all properties, methods, and events therebetween by means of a two-way communications interface object. It is therefore simple to construct a control system capable of fully utilizing functions made available as control objects.

With the control system of the present invention the first control object can receive events generated by a second control object, execute processes appropriate to the received event, and rapidly communicate the event to another control object, application program, or operating system using the first control object. The present invention is therefore able to build a control system that fully utilizes the functions of all common objects.

A control system according to an alternative embodiment of the present invention provides a second interface for receiving events to a control object comprising the functionality of a common object, i.e., a control object comprising a function for informing an application program or other control object of specific properties, including attribute values, or methods for calling implemented functions, and a first interface for issuing events including asynchronous actions, and constructs a control system using a plurality of the control objects.

In a control system according to the present invention a first control object thus comprises a second interface for receiving events, and events occurring asynchronously in a second control object can be immediately communicated through the first interface and second interface to the first control object, or to higher level application programs. It is therefore possible to easily construct a variety of control systems by means of a first control object creating a second control object, and appropriately controlling the first control object and the second control object, and thereby achieving a high speed, multiple function control system.

Other objects and attainments together with a fuller understanding of the invention will become apparent and appreciated by referring to the following description and claims taken in conjunction with the accompanying drawings.

BRIEF DESCRIPTION OF THE DRAWINGS

The present invention will become more fully understood from the detailed description given below and the accompanying diagrams wherein.

DESCRIPTION OF THE PREFERRED EMBODIMENTS

The preferred embodiments of the present invention are described below with reference to the accompanying figures.
Embodiment 1

The first embodiment of the invention is described in detail below based on, for example, an implementation for the Microsoft Foundation Class (MFC), an applications development environment published by Microsoft. Of course as will be appreciated by one of ordinary skill in the art, the present invention may also be practiced with any other suitable environment.

Figure 1:
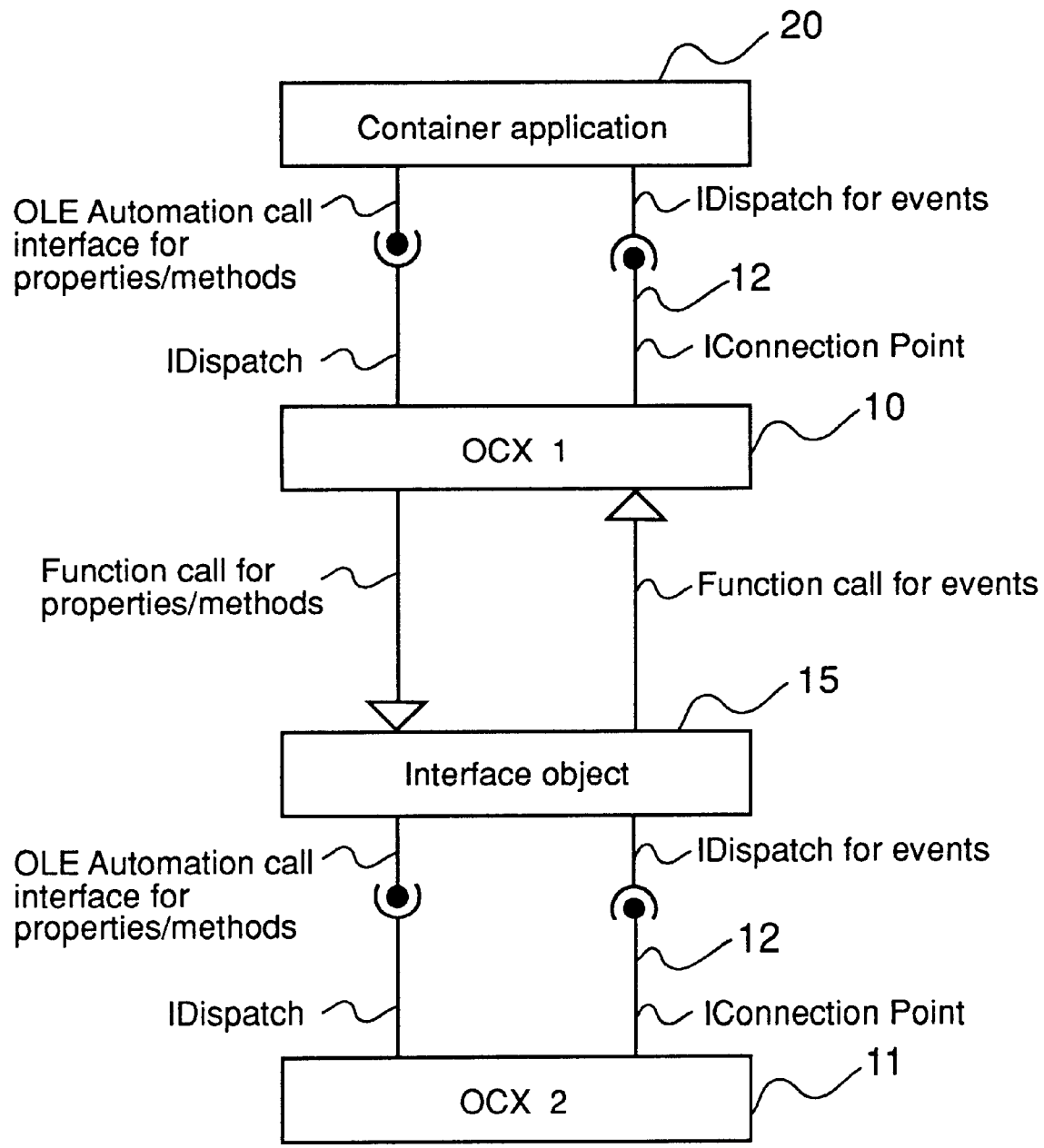
FIG. 1 is a block diagram of the basic configuration of a control system according to a first embodiment of the present invention.

MFC provides various libraries used to facilitate OLE programming, and makes it possible to develop systems using OLE Automation functions written in object-oriented programming languages such as Microsoft's Visual C++. As shown in FIG. 1, these systems are constructed with hierarchical links between the application program (container application) 20 and common objects OCX 10 and 11 written to enable shared use throughout the system.

These common objects can be provided as components of executable software objects, or as Dynamic Link Library (DLL) objects. Executable software and DLL objects providing these common object services are known as EXE servers or DLL servers; the container application 20 is known as a client or controller. Common objects used in the OLE architecture may be derived from a CCmdTarget class provided by Microsoft, for example. The CCmdTarget class is a class supporting the IUnknown interface for managing common objects, and interfaces needed as common objects. The CCmdTarget class also supports the IDispatch interface for delivering structures such as data storage structures from the controller, and can access common object properties and methods by calling the member function Invoke.

Note that properties are the attributes of the common object, and may include colors, text, numbers, fonts, and the operation executed when a given input device, push-button or key is pressed. Methods are functions, such as editing functions, implemented in the common object, and are called to access and use the functions of the common object.

In addition to this function serving properties and methods to client objects, common objects have a function for announcing events. Events are asynchronous external actions, such as clicking a mouse button or pressing a key, accessing the common object. Event announcing is normally accomplished by the common object calling the Invoke function of the controller, similarly to the controller calling properties and methods. If the connection point for the event does not have a valid interface, the event will be ignored. Note that IConnectionPoint 12 is the interface providing a connection for events.

In addition to this function serving properties and methods to client objects, common objects have a function for announcing events. Events are asynchronous external actions, such as clicking a mouse button or pressing a key, accessing the common object. Event announcing is normally accomplished by the common object calling the Invoke function of the controller, similarly to the controller calling properties and methods. If the connection point for the event does not have a valid interface, the event will be ignored. Note that IConnectionPoint 12 is the interface providing a connection for events.

Container application 20 in FIG. 1 is a control system using a common object. In the control system shown in this figure, container application 20 creates a first object OCX 10, and this first OCX 10 creates a second object OCX 11 for control. A COleDispatchDriver class is included in the MFC library to handle the complexities of calling the Invoke function from a container application or OCX. By calling member functions of objects derived from this class, first OCX 10 creates second OCX 11, which is another control object, and can thereby use the methods, etc., of the second OCX 11.

When common objects in the server are used, it is possible, for example, that a given common object may execute on a processor different from the processor on which the container application is executing. In such cases, the control system of the present embodiment can be constructed by executing a communications process on the controller and the server. It is also possible to copy the common objects used on one processor to build a control system. In either case, however, it is not possible to modify the code of used common objects in any way, memory is reserved for the stack and data each time the common object is activated, and the control system is constructed while communicating between the server-side common objects and the controller using the reserved memory.

It is therefore possible for the controller to use the same common object plural times, in which case the common object is not copied plural times, but the data, stack, and other requisite memory areas are discretely reserved for each use. Note that this state in which a common object is made usable by another object is also referred to as an object in this specification.

Note again that when the first OCX 10 is the controller and calls a second OCX 11, it can use an interface object derived from the COleDispatchDriver class. Note that "interface object" is used below in reference to both the interface object. The Visual C++ 2.0 COleDispatchDriver class supports a function for passing methods and properties to the second OCX 11 through the IDispatch interface, but does not support a function for capturing events returned by the second OCX. This does not create a problem when the container application 20 recognizes the second OCX 11 used by the first OCX 10, and comprises a function for capturing events of the second OCX 11. When the container application 20 does not recognize the second OCX 11 used by the first OCX 10, however, it is not possible to capture the events generated by the second OCX 11.

When a common object is already identified, or a common object is readied for a specific container application, it is possible to construct the control system such that a common object can pass events to the container application, or to control processing such that the second OCX 11 does not generate events affecting the container application. However, the ability to construct a more flexible control system is desirable considering the needs of actual control systems to support multiple different external input/output devices and adapt to a wide range of computing environments. It is therefore necessary to support an environment in which one common object can be customized using another common object, e.g., an environment in which the container application 20 can be customized using common objects.

The present invention therefore provides an interface object 15 enabling two-way communications between one common object and another common object, and thereby enabling the construction of more flexible control systems. If common objects are linked using an interface object enabling two-way communications, there is no need for container application 20 to recognize the second OCX 11, and the second OCX 11 can therefore also be provided as an object unaffected by the container application 20.

To achieve an interface object providing complete support even for events, the present embodiment provides a COcxDispatchDriver class handling dispatch processing for one OCX to use another OCX. This COcxDispatchDriver class is an object class derived with multiple inheritance from the CCmdTarget class and the COleDispatchDriver class, and is described as follows.

class COcxDispatchDriver: public CCmdTarget, public COleDispatchDriver {_};

As described above, the CCmdTarget class is the class for deriving objects with a server function, and supports the IDispatch interface. It is therefore possible to achieve an interface object that operates as a server to second OCX 11 while supporting an interface through which events can be passed.

The COleDispatchDriver class, however, is an object class that operates as either client or controller for the second OCX 11, and comprises a function for easily accessing methods and properties.

The COcxDispatchDriver class, which is an object class derived from the above two classes using a Class Wizard, is therefore an object class comprising the two main functions described above while inheriting and supporting all of the functions of both parent classes. The COcxDispatchDriver class is therefore appropriate as an object class generating an interface object according to the present invention. Because there is no overlap between the operation and function of the CCmdTarget class and the COleDispatchDriver class, there is also no problem with multiple inheritance.

The specification for the COcxDispatchDriver class thus derived is as follows.

```
    Class COcxDispatchDriver: public CCmdTarget, public
COleDispatchDriver{
        COcxDispatchDriver::COcxDispatchDriver() // create
        public: // member functions
        UINT m__ObjID; //object ID
            initialized uniquely by EstablishConnection()
        IID m__IIDEvents; // event interface ID
        UINT m__nEvents; // number of events
        CDWordArray m__dispID // array for converting dispatch ID
                according
                    to the user-defined dispatch map
            public: // member functions
            BOOL EstablishConnection(
                REFCLSID clsid,
                COleException*pError=NULL); // creates an object, and
                        enables an access
connection to
                    methods, properties, and
events
            void DestroyConnection(); // releases the connection, and deletes the
object.
            }
```

To achieve a general-purpose class, the COcxDispatchDriver class does not include an event processing function (event handler). It is therefore necessary to describe an event handler for specific OCX events in any objects derived from COcxDispatchDriver. This is accomplished as follows.

A dispatch map is first described according to the external name of the event(s) returned by the OCX. The sequence of events in the dispatch map may be freely ordered, and the correlation to the sequence of events actually received is established when the event connection is established. Note that it is necessary to fully describe all OCX events.

Dispatch map entries may be described as follows with the major parameters being, in sequence, the dispatch driver class name, external event name, event handler name, return values, and parameter data.

```
    DISP__FUNCTION(__DSoprn,           "ControlCompleteEvent",
ControlCompleteEvent, VT__EMPTY, VTS__14 VTS__SCODE
VTS__PBSTR VTS__I4)
```

By describing the dispatch map according to the external event name, events created by the OCX can be received in an intuitive, easily understood format. Because the prototype description of the event handler is described as follows, the prototype description can be stated in the normal function format, thereby greatly facilitating program development.

void __DSoprn::ControlCompleteEvent(long ControlID, SCODE Result, BSTR FAR*, pString, long data);

The process for setting the connection between second OCX 11 and interface object 15 providing an interface derived from the COcxDispatchDriver class as described above is described below with reference to the flow charts in FIG. 2 and FIG. 3. Note that with the interface object 15 of the present embodiment simply calling the member function COcxDispatchDriver::EstablishConnection( ) creates an object (second OCX), supplies the methods and properties, and establishes a connection for receiving events.

Figure 2:
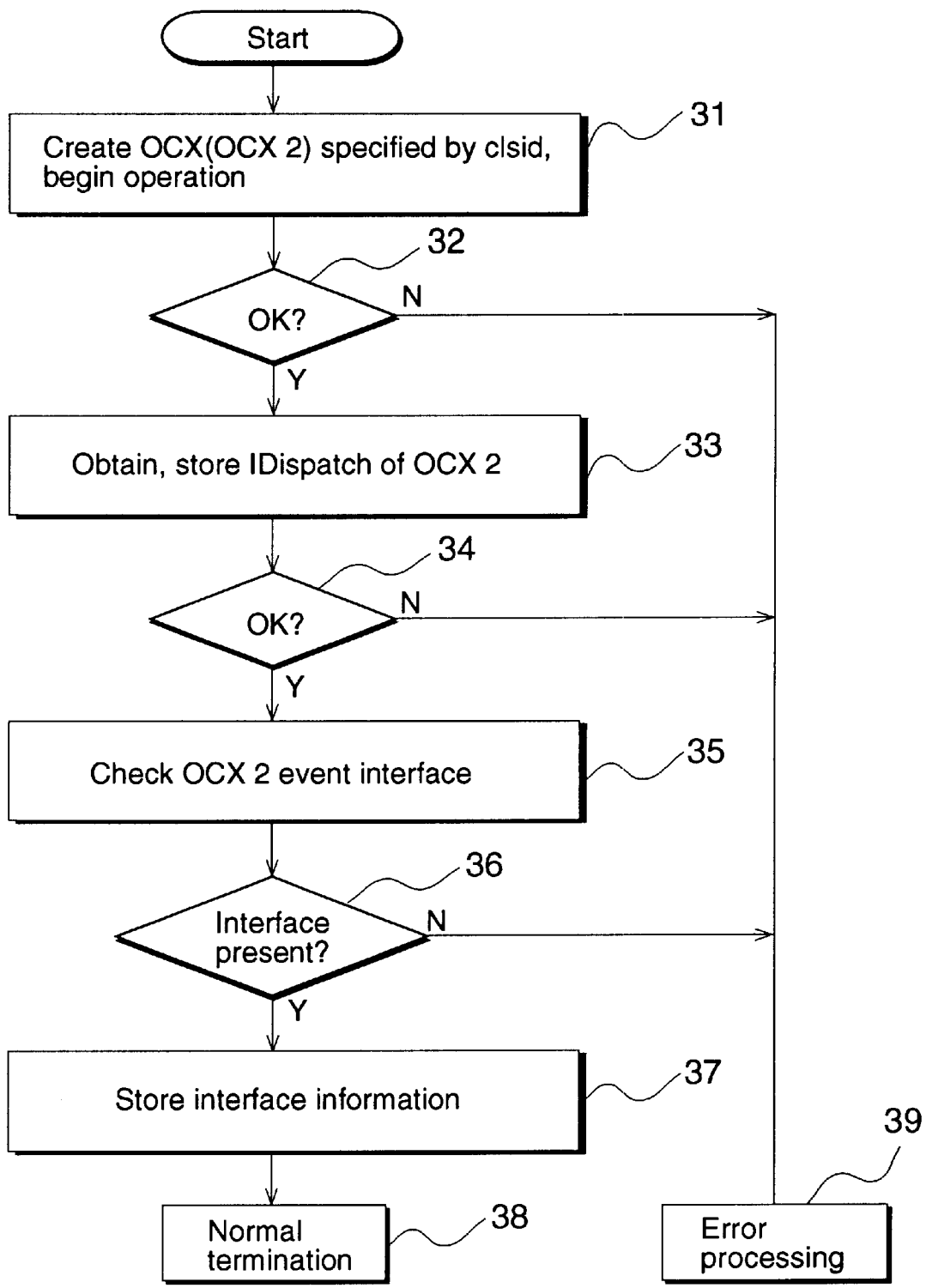
FIG. 2 is a flow chart showing the process for confirming a connection between an interface object in the control system shown in FIGS. 1 and 7.
Figure 3:
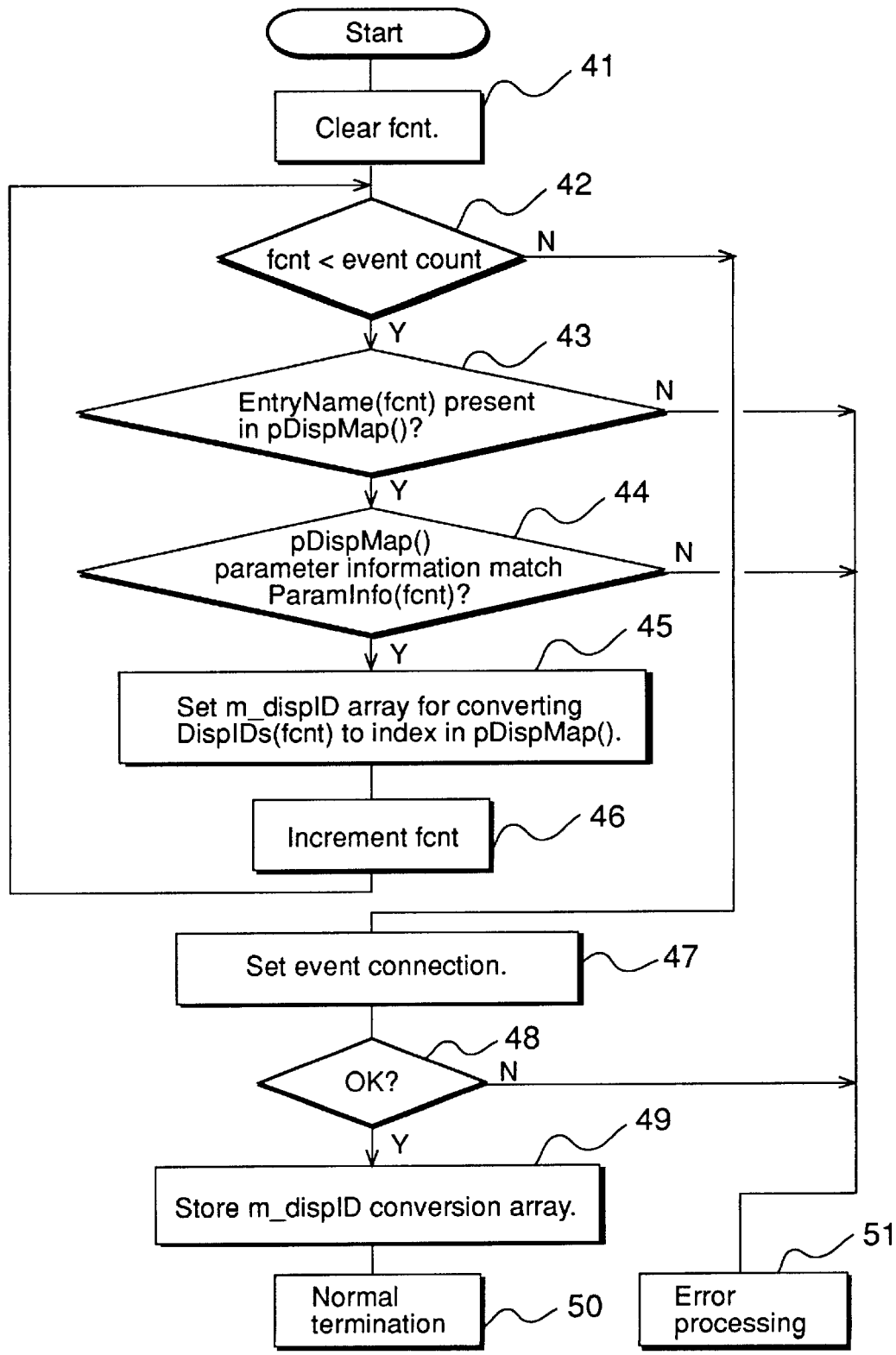
FIG. 3 is a flow chart showing the process for establishing a connection and event correspondence between an interface object in the control system shown in FIGS. 1 and 7.

When EstablishConnection is called, the second OCX 11 defined by clsid (the variable storing a 128-bit value identifying the OCX created) is created and begins executing as shown in step 31 of FIG. 2. When the operation of second OCX 11 is confirmed in step 32, the IDispatch interface of this object 11 is obtained and stored in step 33. The interface object 15 can call the Invoke function, and serve methods and properties to the object 11, through the IDispatch interface. If a connection for passing properties and events to the second OCX 11 is confirmed established in step 34, the event interface of the second OCX 11 is checked in step 35.

If an event interface is confirmed in step 36, the event-related data is stored in step 37. The event name list prepared in second OCX 11 is stored to EntryNames, the dispatch ID list is stored to DispIDs, and the parameter data list is stored to ParamInfo. If these processes are confirmed to have executed and completed normally in step 38, the process defining the correlation between the dispatch map and events is executed according to the flow chart shown in FIG. 3. If, however, a connection cannot be established, an error processing task displaying an error message, for example, is executed in step 39.

The process defining the correlation between the dispatch map and events is described next using the flow chart shown in FIG. 3.

This process starts by clearing the counter fcnt to zero in step 41. The counter fcnt is then read in step 42. Whether the event name EntryNames(fcnt) obtained from second OCX 11 is in the dispatch map pDispMap previously defined in the event handler of interface object 15 is then checked in step 43. If the event name EntryNames(fcnt) is in the dispatch map pDispMap, it is then confirmed (step 44) whether the parameter data ParamInfo(fcnt) matches the dispatch map pDispMap previously defined in the event handler.

If step 44 returns YES, the array m_dispID is defined for converting the dispatch ID DispIDs(fcnt) of the event obtained from second OCX 11 to an index in the dispatch map pDispMap previously defined in the event handler (step 45). The counter fcnt is then incremented in step 46, and the loop from step 42 to step 46 is repeated for each event.

When the correlation to the dispatch map pDispMap is established, a connection for events from second OCX 11 is set (step 47). In this step the event connection is set by passing the address of the IDispatch reserved in interface object 15 for receiving events to IConnectionPoint, the interface for object-object connections. This makes it possible to pass events to interface object 15 by calling the Invoke function of the second OCX 11. More specifically, it is therefore possible for interface object 15 to receive events passed from second OCX 11.

After the connection is established in step 48, the array m_dispID for converting the event dispatch ID is stored in step 49. If the preceding steps are all completed normally and the connection between interface object 15 and second OCX 11 is set, it is possible from step 50 to pass the methods and properties of second OCX 11 to first OCX 10, and to pass events from second OCX 11 to first OCX 10. In practice interface object 15 must notify first OCX 10 that an event has been received from second OCX 11. A public member function that is called when interface object 15 receives an event is therefore provided in first OCX 10, and interface object 15 calls this member function accordingly.

It is therefore possible by using interface object 15 of the present embodiment for two-way communications between common objects to be maintained. This makes it possible to construct a more flexible control system using common.

Note that with the interface object of the present embodiment thus described, the event array of the common object is cross-referenced to the event array of the interface object to establish the correlation between the arrays when establishing the event connection. This makes it possible to set a connection if the types and numbers of events match even if first OCX 10 is not fully informed about the second OCX 11 interface. In other words, two-way connections between plural common objects can be established if the properties, methods, and event names match. Developing common objects is therefore easier, and flexible systems offering greater security and reliability even when updated components and different objects are used can be constructed.

Interface object development is also significantly easier and requires less time because the event handler activated when an event is received can be described using the normal function syntax.

Figure 4:
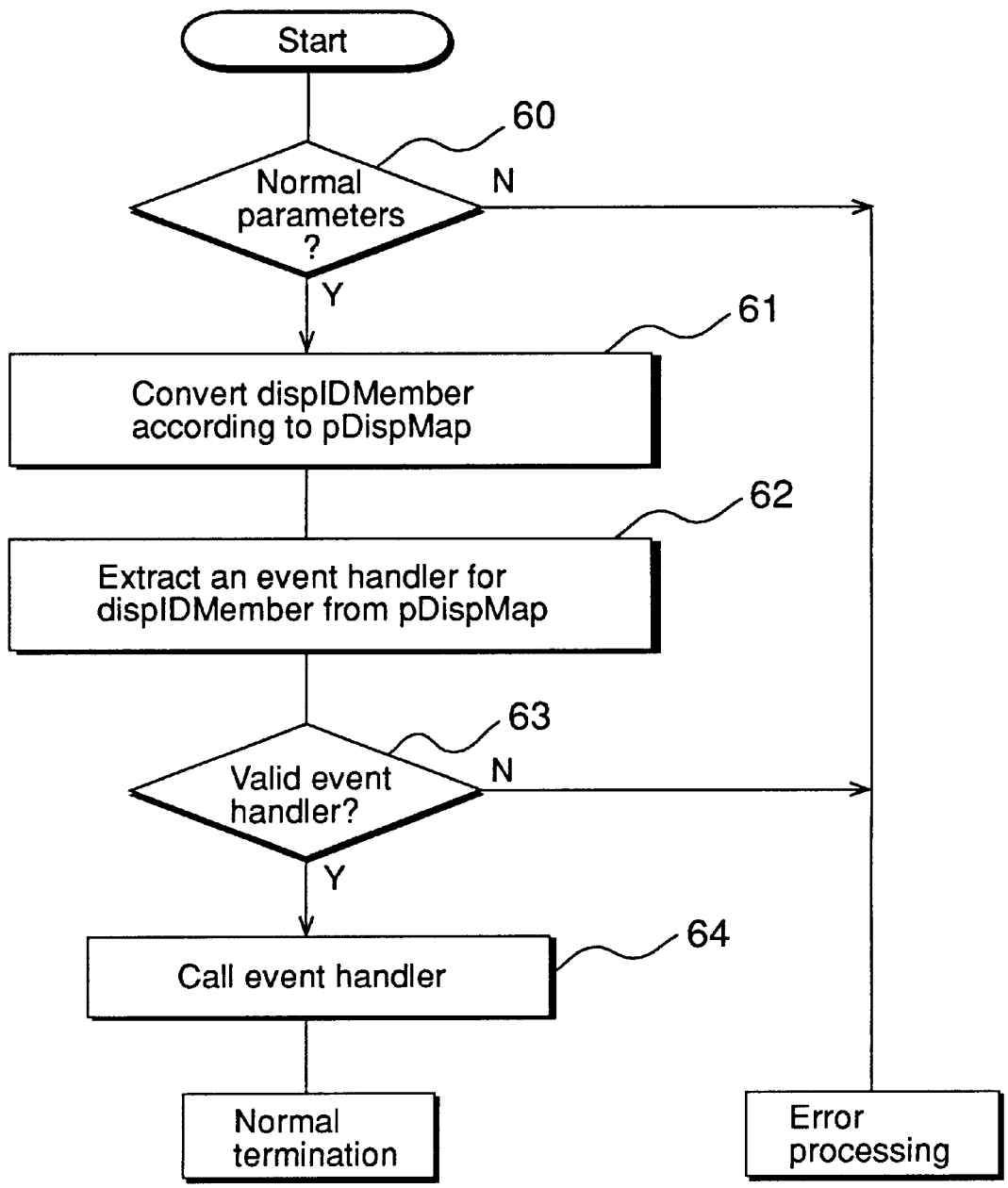
FIG. 4 is a flow chart showing the process whereby an object notifies the interface object of an event in the control system shown in FIGS. 1 and 7.

FIG. 4 is a flow chart of the process executed when the call Invoke(EventID,_) posting events of the IDispatch interface of interface object 15 is called from second OCX 11. The IDispatch interface provides Invoke( ) and the basic functions supporting Invoke( ) (including AddRef( ), Release( ), and QueryInterface(IID&, LPUNKNOWN*)), and responds through QueryInterface(_) to the IID (interface ID) of the event generated by the other OCX.

When Invoke( ) is called, the structure storing the event parameters and the dispatch ID defining the current event type as a parameter is passed to interface object 15. Interface object 15 then checks in step 60 whether the parameters are valid. If the parameters are valid, the dispIDMember array of events obtained from second OCX 11 is converted according to the prepared event handler dispatch map pDsipMap based on the conversion array m_dispID (step 61). The event handler corresponding to dispIDMember is then extracted from pDsipMap in step 62. Whether the event handler is valid or not is then confirmed in step 63; if the event handler is valid, the event handler corresponding to the event is called in step 64, and the process defined by the event handler, e.g., a process informing first OCX 10 of the event, is executed.

Figure 5:
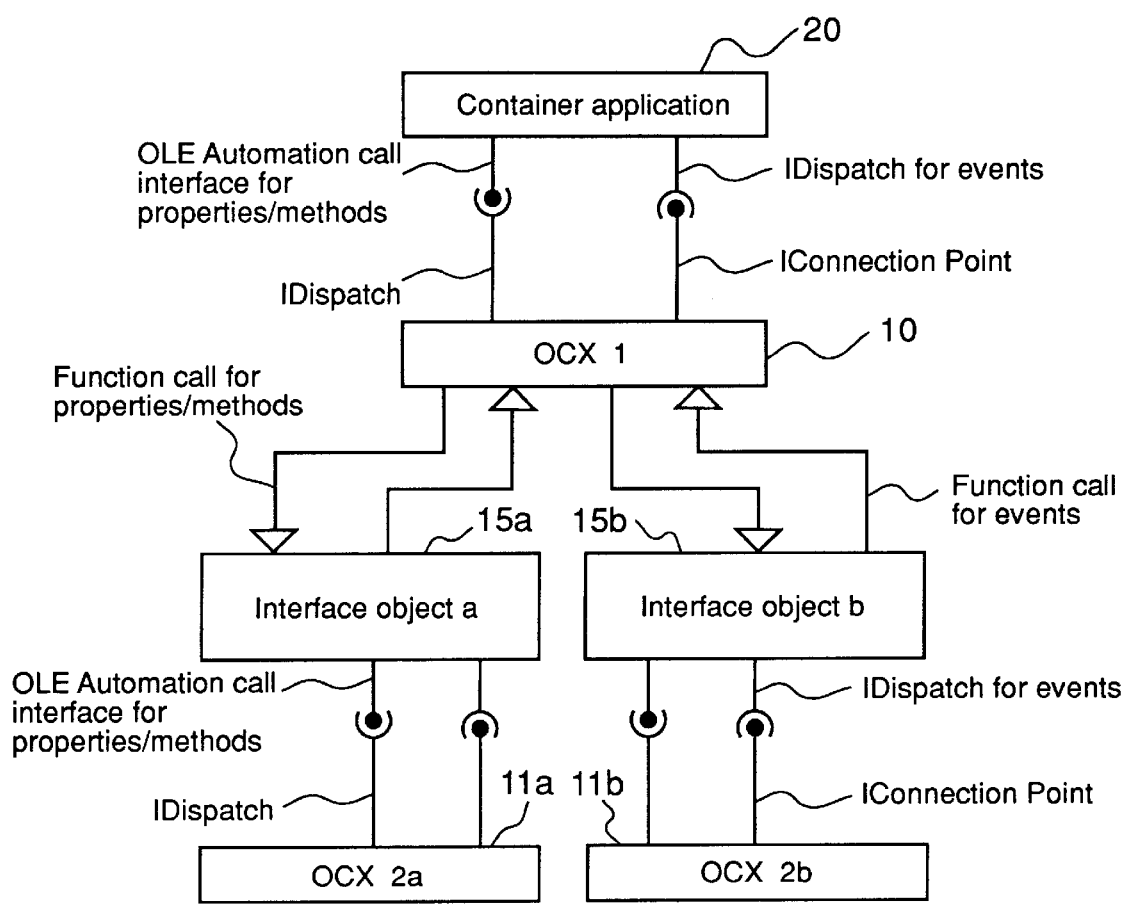
FIG. 5 is a block diagram of a control system using a variation of the first embodiment of the present invention.

A variation of the first embodiment above is shown in FIG. 5. In this variant control system, first OCX 10 generates plural objects 11a and 11b of the second OCX with first OCX 10 controlling both second OCX objects 11a and 11b. More specifically, first OCX 10 is the client or controller for the two second OCX objects 11a and 11b. In this control system the interface between first OCX 10 and second OCX objects 11a and 11b is provided by means of the interface objects 15a and 15b that created the two objects 11a and 11b.

Each time an interface object derived from COcxDispatchDriver is generated, a unique ID enabling each interface object to be identified is generated. When an event is relayed from the interface object to first OCX 10, the first OCX 10 is able to reference the ID unique to each interface object. This ID is a unique value assigned when the interface object is created, but may as necessary be changed to an appropriate value by the interface object creator, i.e., by the first OCX in the present embodiment.

When plural objects 11a and 11b of the second OCX are created as shown in FIG. 5, events generated separately by second OCX objects 11a and 11b are transmitted to the first OCX via interface objects 15a and 15b. The first OCX can therefore clearly determine which of the two second OCX objects generated the events by referencing the unique ID assigned to each interface object. It is therefore possible as described above using the interface object of the present embodiment for a common object (first OCX) to spawn and use plural second objects (second OCX). Even in this case, the creator (first OCX) of the plural objects can identify which one of the second OCXs generated an event without individually managing the plural objects.

The event handlers are also not contained in the object of the first OCX that spawned the plural second OCX objects, but in each of the interface objects. This makes it possible for the creator (first OCX in this embodiment) to reliably determine what events were generated with what parameters by which one of the second OCX objects.

It is therefore sufficient for the second OCX objects to simply post the respectively generated events to the corresponding interface objects, and it is not necessary for each object to determine whether that object is the first object or whether other objects of the same class exist.

By thus using an interface object according to the present invention, a control system comprising plural common objects can be flexibly and easily constructed. It is only necessary to provide each common object with minimal information about the other common objects it will use, and each common object needs only minimal information about the other common objects used. It follows that even greater encapsulation of individual common objects is possible. At the same time, the interface object according to the present invention comprises a two-way communications function capable of communicating even events, and can thereby fully manipulate other common objects used while obtaining full benefit of the functions provided by the other common objects.

It should be noted that while a two-layer control system comprising first and second custom controls OCX has been described in the preceding embodiments of the invention, control systems with a deeper hierarchical structure of three or more layers can also be constructed in the same manner.

It is also possible to achieve an interface between an application program and a first custom control OCX using the interface object described above. It will also be obvious that such control systems shall not be limited to application programs, and may include operating systems.

Furthermore, while the preceding embodiments have been described as achieving the object interface of the present invention under the MFC environment supplied by Microsoft, an object interface comprising the same functionality can be created without using the MFC library. Moreover, systems using common objects equivalent to those described above can be constructed under any system environment using shared common objects, and the invention is therefore not limited to using Microsoft OLE Automation.

Systems using common objects as thus described can also be achieved on stand-alone computers using a single processor, or on systems comprising plural processors connected in a network environment.

By using the interface object thus described, the present embodiment provides a control system offering great extensibility and easy program development. It will be obvious, however, that a common object comprising both the described interface object and the functions of the first custom control OCX can be achieved, and a control system enabling two-way communication of properties, methods, and events can be constructed with a system using this OCX.

Application in a Peripheral Device Control System

Figure 6:
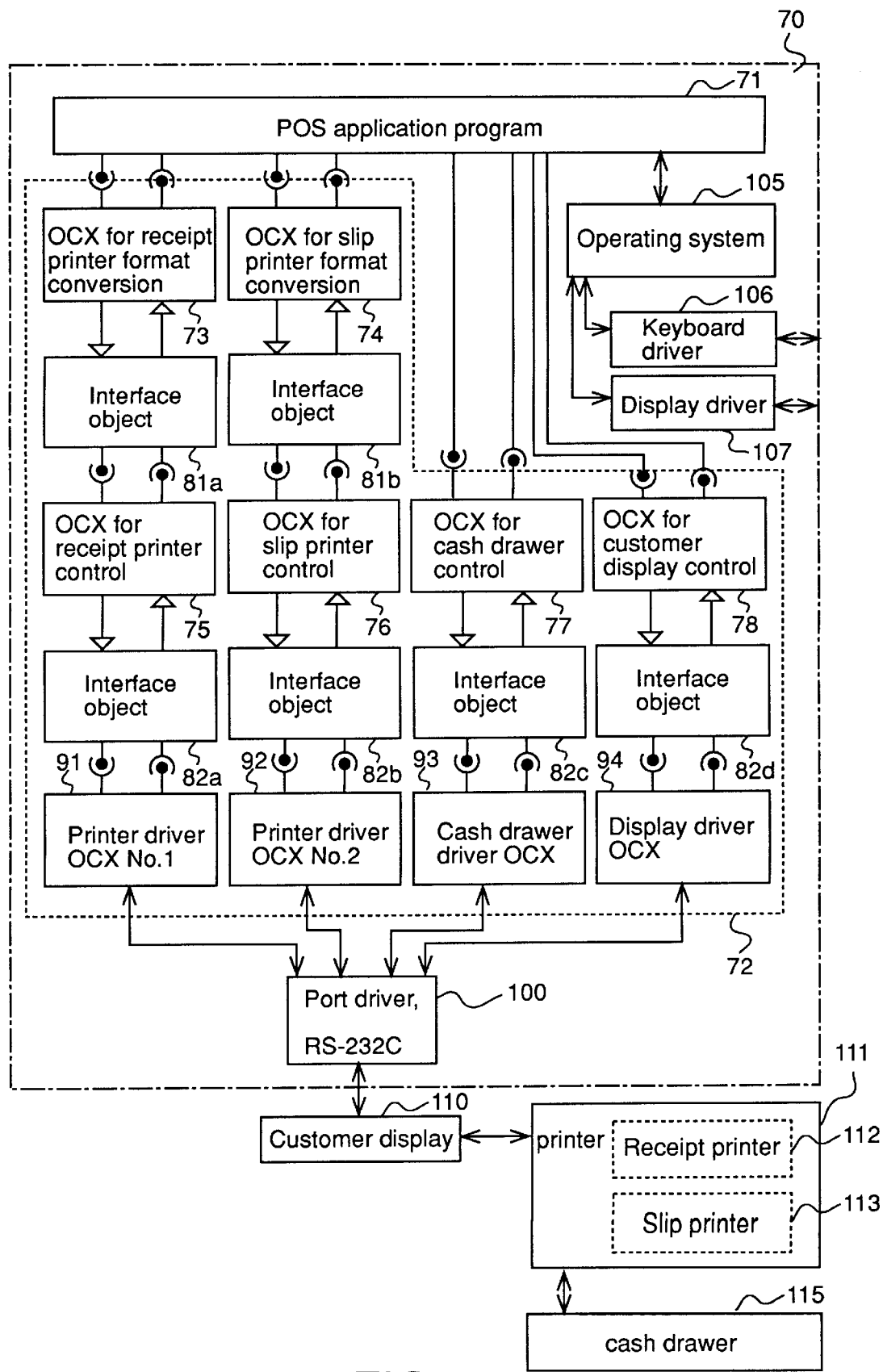
FIG. 6 is a block diagram of the system for controlling the peripheral devices of a point-of-sale (POS) system constructed with a control system using the first embodiment of the present invention.

An example of a peripheral device control system comprising an interface object according to the first embodiment above and plural common objects is shown in FIG. 6. The specific control system shown in FIG. 6 is a point-of-sale (POS) system built around a personal computer (PC) 70. POS application program 71 is installed or stored on a computer readable medium in communication with PC 70, and operates under operating system (OS) 105 generally speaking in a memory. OS 105 has a function for controlling the peripheral devices normally required by a personal computer using a keyboard driver 106, display monitor driver 107, and other device drivers. Data transfers between POS application program 71, the keyboard, monitor, and other devices are controlled by OS 105. The computer readable medium can include, but is not limited to, any type of disk media including floppy disks, optical disks, CD-ROMs, magneto-optical disks, hard drives or disk arrays whether located within or external to the PC 70. Alternatively, the storage medium can include ROM, RAM, EPROM, EEPROM, Flash EEPROM or any other type of media suitable for storing computer readable instructions.

In addition to these peripheral devices normally provided with any personal computer, a POS system also typically comprises a customer display 110 for displaying the purchase amount and other information for customer confirmation; a receipt printer 112 for printing purchase receipts, for example; a slip printer 113 for imprinting checks and other slips; and a cash drawer 115 for holding money. These peripheral devices are connected to an RS-232C port or other expansion port. For example, customer display 110 is connected to the RS-232C port, and a printer 111 comprising both receipt printer 112 and slip printer 113 is connected through the customer display 110. Cash drawer 115 is placed below printer 111, and is operated through the control circuitry of printer 111.

Numerous manufacturers market a variety of such peripheral devices, enabling the user to select the devices best suited to the user's POS system architecture and application. Because the specifications of different peripheral device makes and models differ widely, however, it is extremely difficult to construct an application program suited to all available peripheral devices. Specifications may also change as peripheral devices are upgraded. It is therefore conventionally difficult for users to construct POS systems using peripheral devices selected at the convenience of the user. When individual peripheral devices are upgraded, the new version of a currently-used peripheral device is also not necessarily immediately adaptable to existing POS systems.

When the control system is constructed using the custom controls OCX and interface object of the present invention as described above, an extremely open system can be constructed. It is therefore possible to simply construct a POS system using various different models of peripheral devices. It is also simple to accommodate updated versions of the peripheral devices. For example, peripheral device control system 72 of the present embodiment shown in FIG. 6 comprises three levels of custom controls OCX. The first OCX level has the receipt printer format conversion OCX 73 and a slip printer format conversion OCX 74.

OCX 73 and 74 execute the process arranging the data sent from the POS application program 71, e.g., the list of items sold and the total price, to a specific printing format. The specific printing format may be defined by OCX 73 or 74, or the formatting properties may be defined by lower-level custom controls OCX, i.e., receipt printer control OCX 75 or slip printer control OCX 76 in this example, with conversion OCX 73 or 74 doing the actual formatting using the properties of these custom controls OCX. In either case, POS application program 71 only needs to pass the output data to conversion OCX 73 or 74 irrespective of the print out format. The interface format can therefore be limited to provide an application program with high general utility.

It is also possible to convert data output from the application program in a specific format by a first level OCX to a format common to the lower OCX. This makes it possible to increase the general utility of application programs separately developed using the custom control objects OCX.

Level 2 custom controls OCX include receipt printer control OCX 75, slip printer control OCX 76, cash drawer control OCX 77, and customer display control OCX 78. These custom control objects OCX 75–78 provide a predetermined interface (application programming interface, API) to the application program and other high-level OCX. The application program and high-level OCX can therefore simply supply data according to a predetermined specification irrespective of the manufacturers and models of the printers and other peripheral devices that are part of the POS system. The custom controls OCX 75–78 on this level convert data input according to a common specification to the data format of the lower-level OCX, i.e., to the specifications of the peripheral devices composing the actual system, using the properties of the low driver-level OCX reflecting the specifications of the individual peripheral devices.

Level 3 custom controls OCX include printer driver OCX 91 and 92, cash drawer driver OCX 93, and display driver OCX 94. These custom controls OCX 91–94 are common objects corresponding to each of the peripheral devices, each common object normally differing according to the manufacturer or model and supplied with the peripheral device. These driver-level OCX 91–94 describe, for example, the maximum number of printing lines, the line pitch, and other printer-specific characteristics and settings (i.e., the printer status) as device properties. These properties can then be referenced by higher-level objects or the application program. The driver-level objects also define methods for outputting print commands, including commands to print the text string at a specific position. These driver-level custom controls OCX therefore output commands specific to the corresponding peripheral device through the appropriate port driver. The printer OCX, for example, outputs the line feed distance (i.e., line pitch), line feed commands, print data and print commands, and automatic paper cutter commands in a predetermined sequence to the printer through port driver 100 based on the specified print position and printing string.

Level 3 OCX also receive asynchronously occurring events (actions) back from the corresponding peripheral device. The printer driver, for example, receives the process result and error status sent from the printer. The contents of these actions are then interpreted based on the specifications of the corresponding peripheral device, converted to a universal format, and returned to the higher-level OCX as an event.

High and low level OCX are linked by means of interface objects 81*a*, 81*b*, 82*a*–82*d*, each of which is capable of two-way communications, in the control system of the present embodiment. In addition to methods and properties, events can therefore also be communicated. Level 2 control OCX 75–78 therefore receive these events, and pass the events either directly or after conversion to a universal format through interface objects 82*a*–82*d* to a higher level OCX or application program. Based on the received event, the application program or high level OCX can then output a feedback message to the user, initiate an error processing routine, or execute another defined process. It is therefore possible in the control system according to the present embodiment to quickly execute the process appropriate to asynchronously occurring actions (events).

By using custom controls OCX, the control system of the present embodiment is a system that can be easily customized to match the peripheral devices selected by the user. It is also a control system that can execute the appropriate processes with high speed because two-way communication of properties, methods and events between custom controls OCX is assured.

The control system of this embodiment is described in further detail using a receipt printing function by way of example only.

One property of printer driver OCX 91, which is a level 3 OCX, is the status of receipt printer 112 (printer status). One method of printer driver OCX 91 is outputting print commands to receipt printer 112. Printer driver OCX 91 also asynchronously generates events corresponding to real-time error status information supplied by receipt printer 112. This error status information includes no-paper or paper run-out and cover open status information.

Data from POS application program 71 is passed to receipt printer format conversion OCX 73, a level 1 object, and is converted thereby to the predetermined format before being passed to level 2 receipt printer control OCX 75. When receipt printer control OCX 75 calls the print execution method of printer driver OCX 91, printer driver OCX 91 sends the data and commands appropriate to the printer status of receipt printer 112 to receipt printer 112, and thereby prints receipt. The receipt printer 112 executes the input commands, and returns the predetermined status to printer driver OCX 91.

The printer driver OCX 91 interprets the returned status and terminates printing without generating an event if the error status is not active. Note that it is also possible for the higher level receipt printer control OCX 75 to know the result of the printer process by referencing the printer status property. Communications for this referencing are handled by interface object 82*a*.

If the error status becomes active as a result of print command execution or an error occurring in receipt printer 112 in the standby state, receipt printer 112 sends the error status to printer driver OCX 91. Printer driver OCX 91 generates an event in this case, and notifies the higher level receipt printer control OCX 75 that an error has occurred through interface object 82*a*. Receipt printer control OCX 75 can execute specific processes for a given event, notify the format conversion OCX 73 and POS application program 71 through interface object 81*a*, and cause a specific process to be executed by evoking caution.

In addition to these properties, methods, and events, properties and events unique to slip printing are also preferably provided in the driver OCX 92 for slip printer 113. For example, by adding a slip paper presence property to the driver OCX 92, higher level custom controls OCX and applications can regulate the timing at which the print command is issued. By adding paper insertion detection and paper end detection events to the event list, the application program can be controlled to smoothly execute the normal post-printing processes and error processing.

The cash drawer control OCX 77 communicates with cash drawer driver OCX 93. The cash drawer driver OCX 93 comprises a cash drawer open method, and a cash drawer status property that can be read to determine whether the cash drawer is open or closed. Events are issued when cash drawer errors occur and an open cash drawer is detected.

The customer display control OCX 78 communicates with display driver OCX 94, the methods of which include display commands specifying the display position and the display text string. Properties include the number of display columns, the display color, and other display specifications. Customer display control OCX 78 applies the display data according to these properties. Note that because the customer display is a dumb display, errors and similar events are rare. It is therefore possible to eliminate the event posting function from display driver OCX 94.

As described above, it is possible using the interface object according to the present invention to easily construct a control system comprising a multiple level hierarchical structure using plural custom controls OCX, and to respond rapidly to asynchronously occurring actions, including errors. Note also that the control system of the present embodiment is an open control system that can be easily adapted to a variety of peripheral devices connected to a personal computer. For example, printer 111 comprises receipt printer 112, slip printer 113, and control circuits for cash drawer 115, and the control system comprises custom controls OCX 91–93 dedicated to these separate functions.

It is therefore only necessary to replace the common driver object controlling the slip printer function with a new driver object corresponding to the new specifications when the slip printer in printer 111 is replaced with a slip printer having different printer function specifications (e.g., a different number of print columns or a different executable command set). Once the slip driver object has been updated, the peripheral device control system creates a custom control OCX from the common object for the new driver, and automatically generates a control system suited to the new printer. This same principle applies when driver specifications change as a result of updating the printer driver, i.e., it is only necessary to replace the common object corresponding to the updated driver object, and it is not necessary to modify the other common objects or application program.

This is also true for the customer display and other peripheral devices, i.e., when the specifications change, the control system can be automatically modified by updating the common driver objects. When a POS system is constructed with bar code readers and other additional peripheral devices, the appropriate low-level custom controls OCX are created by the application program or high-level OCX if the common objects for controlling and driving these additional peripheral devices are provided somewhere in the personal computer system. As a result, a peripheral devices control system capable of driving the bar code reader and other peripheral devices is automatically configured.

It is also possible to construct a system using common application programs irrespective of differences in personal computer hardware if the high-level OCX handling the interface to the application programs is capable of absorbing differences in specifications caused by the personal computer hardware, and supplies a common interface to all application programs. The control system is created by the application program with common objects in the personal computer, and a system appropriate to the personal computer and peripheral devices connected thereto is automatically created by the custom controls OCX constituting the control system.

The control system using the custom controls OCX of the present invention is thus an open system, and if the interface specifications are uniform and predetermined, application developers can develop and supply individual application programs without considering the specifications of the personal computer and peripheral devices connected thereto, or the method of connecting peripheral devices to the personal computer. Applications can therefore be developed in a short time and thus supplied at a low cost. This architecture also makes it possible for individual users to freely select the applications suited to their own objectives and environment irrespective of the personal computer or peripheral devices used.

Peripheral device suppliers can also supply general-purpose peripheral devices unrestricted to specific personal computer platforms or applications by providing a low-level common object corresponding to the specifications of the supplied peripheral device, and supplying this common object with the peripheral device, for example. This also enables users to freely purchase peripheral devices suited to their own objectives and environment, and thereby easily construct a system designed for individual objectives.

It should be noted that there are many different types and numbers of peripheral devices that can be used, and while a POS system is described above as an example of a system in which various different types of peripheral devices are used according to individual user environments, the present invention shall obviously not be limited to POS systems. Systems built around personal computers increasingly combine peripheral devices of various makers and specifications according to the objectives and capabilities of the user. Control systems using common control objects according to the present invention are systems that can be flexibly adapted to a variety of user intentions, and can be applied to a variety of systems other than POS systems.

Embodiment 2

Figure 7:
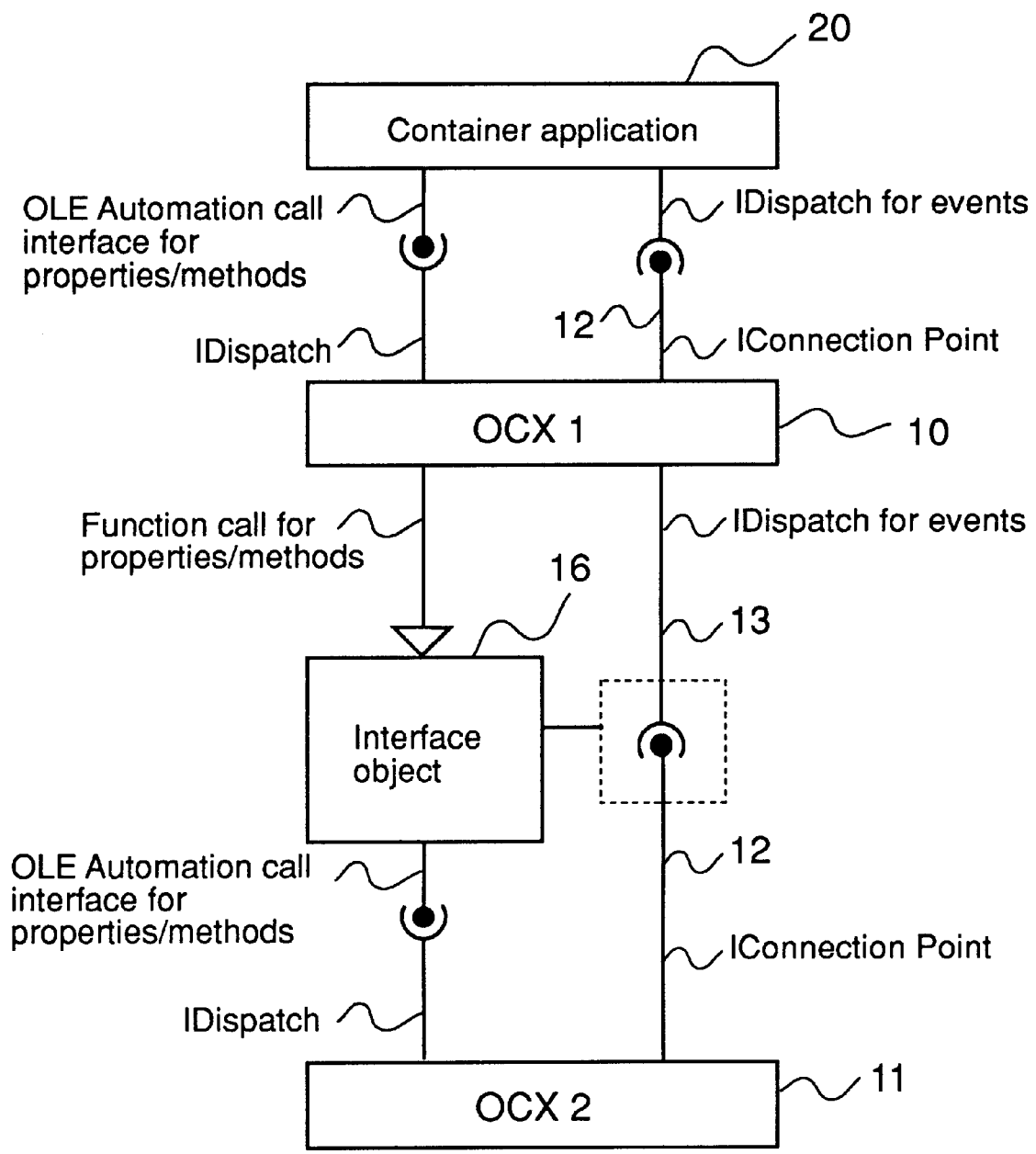
FIG. 7 is a block diagram of the basic configuration of a control system according to a second embodiment of the present invention.

FIG. 7 is a block diagram of the basic configuration of a control system according to the second embodiment of the present invention. In this embodiment IDispatch 13 for events is provided in a common object as the interface for receiving events. When events are communicated between custom controls OCX, the interface of the custom control OCX posting the event therefore advises IConnectionPoint 12 about the event IDispatch 13 of the OCX processing the event, i.e., passes an address identifier and opens a connection. Different identifiers can obviously be used under environments other than MFC, and different identifiers can be passed to either interface 12 or 13.

In addition to providing an event interface 13 in a custom control OCX to enable two-way communications between custom controls OCX, an interface object connecting event interfaces is also derived from the COleDispatchDriver class in this embodiment. In other words, the control system of the present embodiment connects first OCX 10 and second OCX 11 by means of interface object 16 where first OCX 10 comprises IConnectionPoint 12 as the interface for posting events as described above, and event IDispatch 13 as the interface for receiving events, and second OCX 11 downstream from first OCX 10 comprises IConnectionPoint 12 as the interface for posting events.

In addition to a function for supplying the properties and events of second OCX 11 to first OCX 10, interface object 16 of the present embodiment has a function for passing the address of event IDispatch 13 of first OCX 10 to IConnectionPoint 12 of second OCX 11. When first OCX 10 generates an interface object 16 of the present embodiment, and interface object 16 generates second OCX 11 according to first OCX 10, a connection between IConnectionPoint 12 of second OCX 11 and event IDispatch 13 of first OCX 10 is opened, and events posted by second OCX 11 can be received by first OCX 10. Two-way communication between second OCX 11 and first OCX 10 is therefore possible, and there is no need for container application 20 to recognize second OCX 11. Second OCX 11 can also be supplied as an object unaffected by the container application 20.

Note that interface object 16 is derived from the COcxDispatchDriver class in the present embodiment. This COcxDispatchDriver class is an object class derived with multiple inheritance from the CCmdTarget class and the COleDispatchDriver class, and is described as follows.

class COcxDispatchDriver: public CCmdTarget, public COleDispatchDriver {_};

As described above, the CCmdTarget class is the class for deriving objects with a server function, and the COleDispatchDriver class is an object class that operates as either client or controller for the second OCX 11, and comprises a function for easily accessing methods and properties.

The COcxDispatchDriver class, which is an object class derived from the above two classes using a Class Wizard, is therefore an object class comprising the two main functions described above while inheriting and supporting all of the functions of both parent classes. The COcxDispatchDriver class is therefore appropriate as an object class generating an interface object according to the present embodiment. Because there is no overlap between the operation and function of the CCmdTarget class and the COleDispatch-Driver class, there is also no problem with multiple inheritance.

The specification for the COcxDispatchDriver class thus derived is as follows.

```
Class COcxDispatchDriver: public CCmdTarget,
    public COleDispatchDriver{
COcxDispatchDriver::COcxDispatchDriver() // create
public: // member functions
IID m__IIDEvents; // event interface ID
UINT m__nEvents; // number of events
CDWordArray m__dispID // array for converting dispatch ID
    according
        to the user-defined dispatch map
public: // member functions
BOOL PrecreateDispatch(
    REFCLSID clsid,
    CStringArray& EntryNames,
    CDWordArray& DispIDs,
    CSstringArray& ParamInfo,
    COleException*pError=NULL); // creates an object, and
        stores interface
information.
    BOOL EstablishConnection(
        LPUNKNOWN pUnkSink,
        LPCDMENTRY pDispMap,
        CStringArray& EntryNames,
        CDWordArray& DispIDs,
        CStringArray& ParamInfo,
        COleException*pError=NULL); // confirms whether the
event
            interface is the same on
posting
            and receiving sides, and
connects
            the two sides.
    void DestroyConnection(); // releases the connection, and deletes the
object.
}
```

The interface object derived from the COcxDispatch-Driver class in this embodiment only has a function for opening an event interface connection between custom controls OCX, and therefore does not have an event processing function (event handler). The event handler is provided in the custom control OCX receiving the events. This is accomplished as follows.

A dispatch map is first described according to the external name of the event(s) returned by the OCX posting the events. The sequence of events in the dispatch map may be freely ordered, and the correlation to the sequence of events actually received is established when the event connection is established. Note that it is necessary to fully describe all OCX events.

Dispatch map entries may be described as follows with the major parameters being, in sequence, the dispatch driver class name, external event name, event handler name, return values, and parameter data.

```
DISP__FUNCTION(__DSoprn,         "ControlCompleteEvent",
ControlCompleteEvent, VT__EMPTY, VTS__14 VTS__SCODE
VTS__PBSTR VTS__I4)
```

The process for setting the connection between first OCX 10 and second OCX 11 by means of interface object 16 derived from the COcxDispatchDriver class is described below with reference to the flow charts in FIG. 2 and FIG. 3.

When interface object 16 is created and PrecreateDispatch is called, the second OCX 11 defined by clsid is created and begins executing as shown in step 31 of FIG. 2. Subsequent operation is the same as in the first embodiment above, and further description is therefore omitted below.

The process defining the correlation between the dispatch map and events is described next using the flow chart shown in FIG. 3.

This process is started by setting the identifier (the address of the event IDispatch of first OCX 10 in this embodiment) of the interface to first OCX 10, which is the object receiving events, in pUnkSink, and calling EstablishConnection. The counter fcnt is then cleared to zero in step 41. The counter fcnt is then read in step 42. Whether the event name EntryNames(fcnt) obtained from second OCX 11 is in the dispatch map pDispMap previously defined in the event handler of first OCX 10 is then checked in step 43. If the event name EntryNames(fcnt) is in the dispatch map pDispMap, it is then confirmed (step 44) whether the parameter data ParamInfo(fcnt) matches the dispatch map pDisp-Map previously defined in the event handler.

If step 44 returns YES, the array m__dispID is defined for converting the dispatch ID DispIDs(fcnt) of the event obtained from second OCX 11 to an index in the dispatch map pDispMap previously defined in the event handler (step 45). The counter fcnt is then incremented in step 46, and the loop from step 42 to step 46 is repeated for each event.

When the correlation to the dispatch map pDispMap is established, a connection is opened for passing the identifier, stored in pUnkSink, of the interface to first OCX 10 to the event interface of second OCX 11 (step 47). Because the present embodiment is described within the MFC environment, the address is passed to IConnectionPoint to establish the event connection. This makes it possible to pass events to first OCX 10 by calling the Invoke function of the second OCX 11. More specifically, it is therefore possible for first OCX 10 to receive events passed from second OCX 11.

After the connection is established in step 48, the array m__dispID for converting the event dispatch ID is stored in step 49. If the preceding steps are all completed normally and the connection between interface object 16 and second OCX 11 is set, it is possible from step 50 to pass the methods and properties of second OCX 11 to first OCX 10, and to pass events from second OCX 11 to first OCX 10.

FIG. 4 is a flow chart of the process executed when the call Invoke( ) posting events of the IDispatch interface of interface object 16 is called from second OCX 11.

When Invoke( ) is called, the structure storing the event parameters and the dispatch ID defining the current event type as a parameter is passed to first OCX 10. The event-receiving first OCX 10 then checks in step 60 whether the parameters are valid. If the parameters are valid, the dispID-Member array of events obtained from second OCX 11 is converted according to the prepared event handler dispatch map pDsipMap based on the conversion array m__dispID (step 61). The event handler corresponding to dispIDMember is then extracted from pDsipMap in step 62. Whether the event handler is valid or not is then confirmed in step 63; if the event handler is valid, the event handler corresponding to the event is called in step 64, and the process defined by the event handler, e.g., a process informing the application program of the event, is executed.

Note that while the present embodiment has been described with only one second OCX 11 linked to first OCX 10, it will be obvious that plural second OCX 11 can be connected to first OCX 10. If there is only one event-receiving interface, the event array must contain identical events, and all second OCXs 11 should preferably be the same type.

Application in a Peripheral Device Control System

Figure 8:
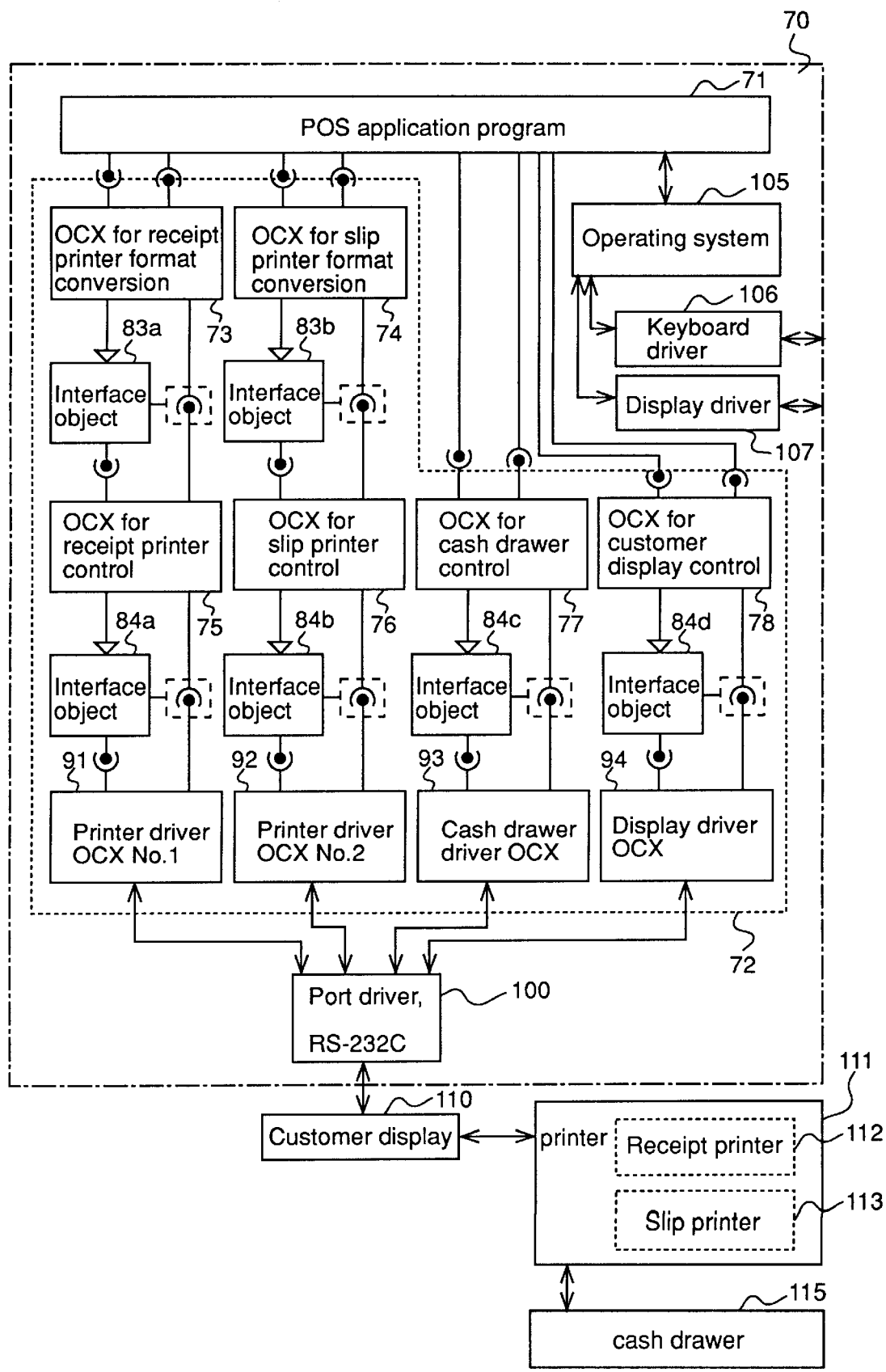
FIG. 8 is a block diagram of the system for controlling the peripheral devices of a point-of-sale (POS) system constructed with a control system using the second embodiment of the present invention.

An example of a peripheral device control system applying the control system of the second embodiment is shown in FIG. 8. In the control system of this example the custom controls OCX on at least the first and second levels are objects comprising an IDispatch interface as described above for communicating events. Therefore, by connecting high and low level objects using interface objects 83a, 83b, and 84a–84d according to the present invention, high and low level objects can be linked using an interface capable of communicating events in addition to methods and properties. Further description of this application is therefore omitted below because the configuration and operation thereof are the same as in the peripheral device control system shown in FIG. 6 and described above.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

Reference Numerals
10 first OCX
11 second OCX
15 interface object
16 interface object
20 container application
70 personal computer
71 POS application program
72 control system built with control objects
100 port driver
110 customer display
111 printer
112 receipt printer
113 slip printer
115 cash drawer

What is claimed is:

1. A control system used in a computer for controlling a point-of-sale peripheral device connected to an interface port of the computer in accordance with a point-of-sale application object, comprising:

a first object that provides a point-of-sale peripheral device independent interface to the point-of-sale application object;

a second object corresponding to the point-of-sale peripheral device that describes device properties, outputs commands corresponding to methods defined therein and receives asynchronously occurring events from the point-of-sale peripheral device, the device properties and the commands being specific to the point-of-sale peripheral device; and an interface object having:
      a first function for communicating the device properties and methods between the first object and the second object; and
      a second function for posting the asynchronously occurring events from the second object to the first object.

2. A control system according to claim 1, further comprising an operating system, wherein the point-of-sale application object operates under the operating system.

3. A control system according to claim 1, further comprising a port driver which drives the interface of the computer to output to the point-of-sale peripheral device the commands received from the second object.

4. A control system according to claim 1, wherein the point-of-sale device includes at least one of a receipt printer, a slip printer, a cash drawer and customer display.

5. A control system according to claim 1, wherein at least one of the first object and the second object is created by OLE custom controls.

6. A control system according to claim 1, wherein the interface object comprises an OLE automation call interface for communicating the device properties and the methods to the second object.

* * * * *